Jan. 31, 1928.
S. FAITH
MOTOR SAFETY SIGNAL
Filed Nov. 17, 1926
1,657,857
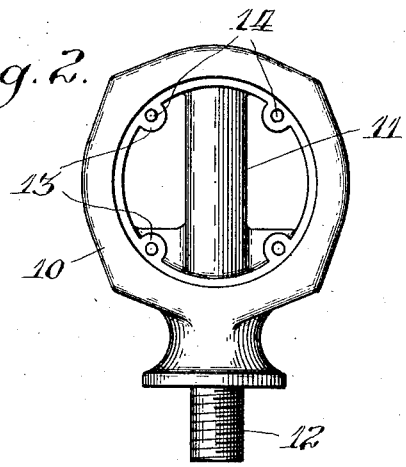
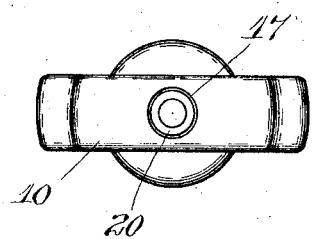
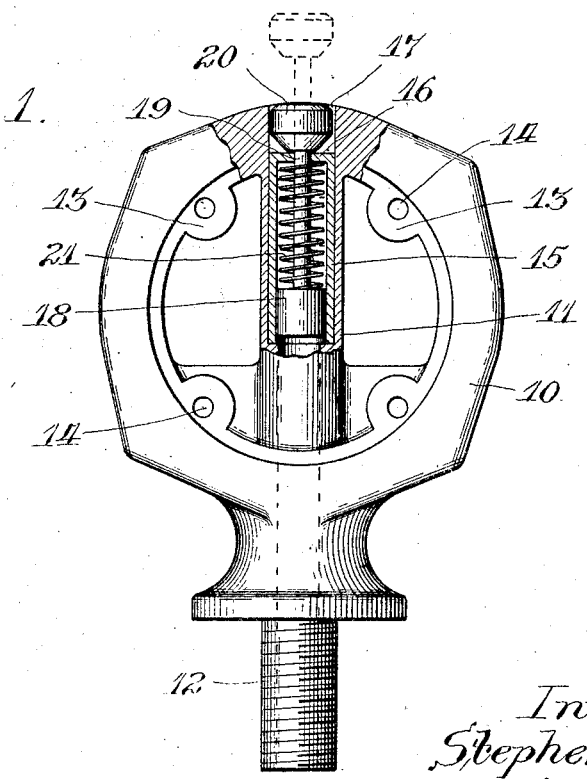
Inventor.
Stephen Faith,
By Paul O. Pippel
Atty.

Patented Jan. 31, 1928.

1,657,857

UNITED STATES PATENT OFFICE.

STEPHEN FAITH, OF CHICAGO, ILLINOIS.

MOTOR SAFETY SIGNAL.

Application filed November 17, 1926. Serial No. 148,834.

This invention relates to indicators and particularly to a motor safety signal for use in connection with the radiator of an automobile. Specifically, it relates to a pressure operated device exposed to radiator steam pressure, whereby an indication will be given of abnormal thermal conditions existing in the radiator, which may be caused by a failure of the engine water cooling system, or by faulty lubrication of the engine parts. It is thus important to provide an efficient means for giving the operator of a motor vehicle an indication of such abnormal conditions, so that their causes may be corrected before injury results to the motor.

It is the primary object of this invention to provide an efficient pressure responsive indicator, which is adapted for attachment to the cap of an automobile radiator in a manner to give an indication of abnormal engine conditions.

A further object of the invention is generally to improve devices of this kind so that the same will be simple and effective for the purposes intended, and may be manufactured and sold at a minimum of cost.

These very desirable objects are briefly accomplished in the provision of an indicator, comprising a shell, formed as an integral casting having a central, vertical, bored-out member. The bore is in communication with the interior of the automobile radiator when in use, and receives through its upper end, a headed sleeve, said sleeve being spaced from the upper end of the bore to leave a recess in the upper side of the shell for the reception of a normally hidden semaphore or target. This target is mounted on the free end of a piston slidably mounted in said sleeve, the piston being movable by steam pressure to project the target from its concealed position to a position exterior of the shell, where it will clearly be visible to the operator of a motor vehicle.

Referring now to the drawings, wherein an illustrative embodiment of this invention has been shown,—

Figure 1 is an enlarged front elevational view of the improved indicator, partly in section;

Figure 2 is a similar view showing the casting constituting the shell for the indicator; and Figure 3 is a top plan view of the indicator.

As shown in the drawings, the body of the indicator is in the form of a cast shell 10, of ornamental contour, and formed with a central, vertical and integral bored-out member 11. At its bottom, this bore receives a threaded nipple 12 for affixation in the radiator cap of an automobile. The shell is also formed with small integral bosses 13 which are each apertured at 14 for a purpose later to appear.

As shown in Figure 1, it will be observed that there is driven into the bore 11 from the top side of the shell, a sleeve 15, formed with a centrally apertured head 16, the sleeve being driven into the bore 11 a sufficient distance to leave a recess 17 in the top side of the shell 10, as shown. Slidably fitted into the sleeve 15 is a piston 18, exposed to steam pressure from within a radiator, the piston having a stem 19 extending upwardly through the apertured head 16, where it carries a colored indicator 20 in the form of a semaphore or target, said indicator being normally held down hidden in the recess 17 by means of a coil spring 21. The bosses 13 and apertures 14 therein serve as supports for mounting of face plates (not shown) at the front and back sides of the device, as will be understood, by any suitable securing means, such as small screws, to give the indicator a neat and attractive appearance with all working parts obscured from view. As shown in Figures 1 and 3, it is to be noted that the target 20, when seated in its recess 17, extends flush with the top side of the shell, and thus, under normal conditions, does not destroy the ornamental outline of the signal device.

In use, it will be understood that the signal will be mounted in a radiator cap by means of the fitting 12 in such a manner that the bore 11 of the shell will be exposed to steam pressure from within the radiator. Should an excess of steam be generated in the radiator, due to any condition such as lack of sufficient water or lack of oil for lubricating the engine, which will create an abnormal thermal condition, then the pressure of steam resulting therefrom will force the piston 18 upwardly to project the target 20 from its recess to a point substantially outside of the top side of the shell, as shown in Figure 1 in the dotted lines, where it will clearly be visible to give indication of a critical motor condition. The spring 21 is a very fine one, and functions to return the target to its recess within the shell, when the critical condition has passed and the motor once more operates normally.

The shell and bored member 11 have been preferably cast as an integral piece of the usual alloys used for making die castings of this kind. Such alloys when exposed to the steam from the radiator rapidly deteriorate from the corrosive action of the steam. The sleeve 15 is therefore made of a metal that will not be affected by the steam and is securely placed in the bore by a drive fit. Thus, the steam cannot destroy the signal as its important part 15 will withstand any corrosive action of the steam and partly protect the bored member 11 and also insure at all times a smooth guide for the piston 18.

It is now clear from the above detailed disclosure that a simple and efficient signal has been provided for the purposes stated which achieves all of the desirable objects heretofore recited.

Of course, the illustrative embodiment herein shown is susceptible of changes and modifications, and it is to be understood that it is the intention to cover all such changes and modifications as to do not materially depart from the spirit and scope of this invention, as hereinafter claimed.

What I claim as new is:

1. In a signal, the combination of an open, substantially circular shell having an integral diametrically arranged bored out member, means for mounting the shell on an automobile radiator, a sleeve in the bore having an integral apertured head disposed inwardly of the side of the shell to leave a recess, said sleeve being of a metal to resist corrosion by steam, a piston slidably mounted in the sleeve, a stem on the piston extending through the head of the sleeve, an indicator on the free end of the stem normally concealed in said recess, said piston being exposed to steam pressure from the radiator to project the indicator from its recess to a point substantially outside of the shell, and means in the sleeve for returning the indicator to its recess.

2. An indicator comprising an open substantially circular shell having an integral, vertically disposed, central bored-out member, a sleeve in the bore leaving a recess at the top end of the bore, said sleeve being of a metal that will resist corrosion by steam, an indicator normally concealed in said recess, and pressure responsive means in the sleeve for projecting the indicator to a point substantially outside of said shell.

3. An indicator comprising a substantially circular shell having a diametrically and vertically arranged integral bored-out member, a sleeve in the bore having a head arranged below the top side of the shell to leave a recess, said sleeve being of a metal that will resist corrosion by steam, an indicator normally concealed in the bore and resting on the head of the sleeve, a piston having a stem connected to the indicator, said piston being located in the sleeve and having its stem movable through the head of the sleeve, said piston means being adapted to project the indicator out of its recess, and means in the sleeve for returning the indicator to its recess.

4. An indicator shell formed as an open substantially circular casting having a centrally and vertically arranged integral bored-out member, said member adapted to receive an indicator and pressure responsive means for operating the same, and apertured bosses integrally formed with the shell adapted to receive attaching means for cover plates.

5. As a safety signal attachment for an automobile radiator cap responsive to steam pressure, said signal comprising an open shell including an integral bored out member arranged vertically and diametrically thereacross, a headed sleeve in said bored member of steam resisting qualities, said sleeve having its head hidden to leave a recess in the shell, a target in the recess normally resting on the head, a pressure responsive member in the sleeve and movable through said head to project said target completely out of its recess, and means for returning said target to its recess.

Chicago, Illinois, November 12th, 1926.

STEPHEN FAITH.